M. E. LOUTH & J. JACKSON.
ELECTRIC HEAT STORAGE HEATING UNIT.
APPLICATION FILED SEPT. 13, 1915.
1,238,793.
Patented Sept. 4, 1917.
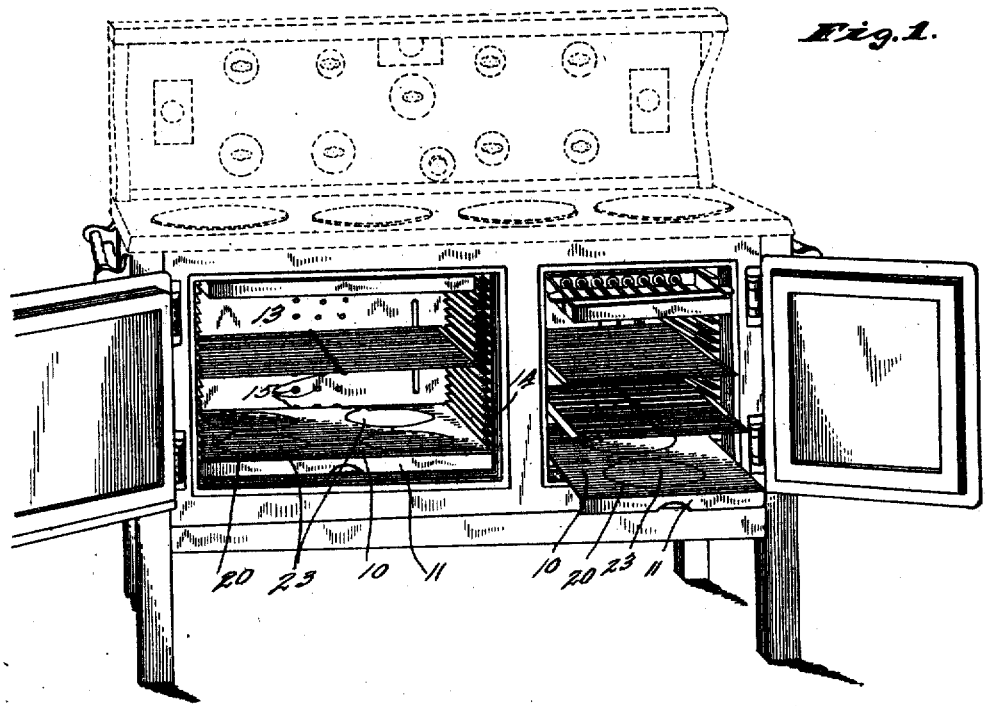
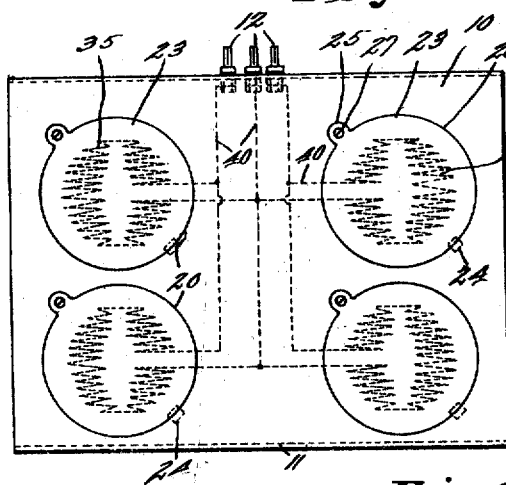
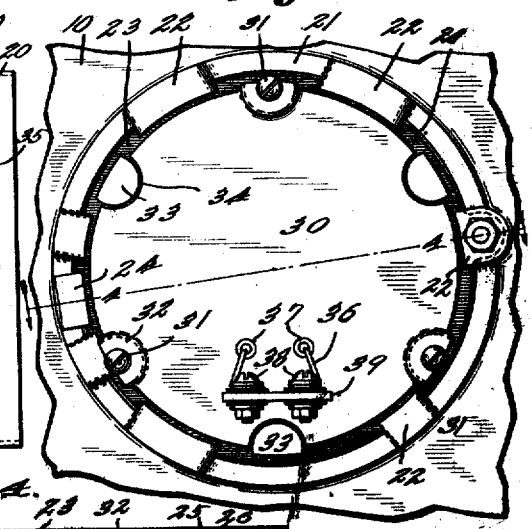
WITNESSES:
F. B. Thompson
P. W. Pomeroy
INVENTORS
Maurice E. Louth
Jesse Jackson
BY
Raffell & Earl
ATTORNEYS

UNITED STATES PATENT OFFICE.

MAURICE E. LOUTH AND JESSE JACKSON, OF KOKOMO, INDIANA, ASSIGNORS TO THE GLOBE STOVE & RANGE COMPANY, OF KOKOMO, INDIANA.

ELECTRIC HEAT-STORAGE HEATING UNIT.

1,238,793.     Specification of Letters Patent.     Patented Sept. 4, 1917.

Application filed September 13, 1915. Serial No. 50,401.

*To all whom it may concern:*

Be it known that we, MAURICE E. LOUTH and JESSE JACKSON, citizens of the United States, residing at Kokomo, in the county of Howard and State of Indiana, have invented certain new and useful Improvements in Electric Heat-Storage Heating Units, of which the following is a specification.

The object of this invention is to provide an electric heating unit for electric ovens which has a number of interchangeable sub-units which are easily removable and replaceable, as for inspection, repair, or the substitution of new parts; and which unit is itself removable and has a considerable heat storage capacity.

Further objects, and objects relating to structural details will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing forming a part of this specification, in which:

Figure 1 is a perspective view of an electric range having two ovens, in the lower part of each of which there is one of my improved electric heating units, these units being of different size in the two ovens.

Fig. 2 is a plan view of the larger of these heating units.

Fig. 3 is a fragmentary bottom view of the heating unit, showing one of the sub-units and its mounting.

Fig. 4 is a section on the line 4—4 of Fig. 3.

In the drawing, similar reference characters refer to similar parts throughout the several views, and the sectional views are taken looking in the direction of the little arrows at the ends of the section lines.

Our improved heating unit comprises a flat metal plate 10, which at its forward edge conveniently has a down-turned flange 11 provided with a hand hold, and at its rearward edge is provided with a number of projecting split terminal pins 12, so that when the unit is slid into or out of the oven 13 on the ledges 14 on the side walls thereof such projecting split terminal pins 12 will engage with or disengage themselves from corresponding terminal sockets 15 in the rear wall of the oven. The terminal sockets 15 are suitably connected through any control mechanism to an electric supply circuit. The plate 10 contains a considerable mass of metal, so that it serves as a heat storage means for retaining heat in the oven 13 after the heating circuit is opened, so that a continuance of the cooking after the manner of a fireless cooker may be obtained.

The heater plate 10 is provided with a plurality of holes 20, of which there are shown four on the heating unit in the larger oven and two on the heating unit in the smaller oven. Around the periphery of each hole 20 preferably extends a strengthening flange 21 from which a number of supporting lugs 22 project a slight distance inward toward the center of the hole. On these lugs 22 rests the top plate 23 of a sub-unit, of which there is one for each hole 20. These sub-units carry the heating conductors, of which more hereafter, and the upper surfaces of the top plates 23 thereof are preferably flush with the upper surface of the plate 10. The top plate 23 of each sub-unit is provided at one point on its periphery with a downwardly offset and outwardly projecting finger 24 which extends under the lower edge of the strengthening flange 21, as is clear from Fig. 4, and at a point directly opposite this finger 24 the top plate 23 is provided with an outwardly projecting finger 25 which is in the plane of the top plate and fits into a recess 26 in the edge of the hole 20 and over one of the lugs 22. The finger 25 and the lug 22 over which it fits are provided with registering holes for receiving a bolt 27 which fastens the top plate in place in the hole. Below the top plate 23 and slightly spaced therefrom is a bottom plate 30, which is smaller than the figure formed by the inner ends of the lugs 22. This bottom plate 30 is attached to the top plate 23 by screws 31, which extend through such bottom plate into internally threaded bosses 32 on the under side of the top plate 23. If desired, the bottom plate 30 may be further positioned with respect to the top plate by a series of downwardly projecting lugs 33 on the under side of the top plate 23, which lugs project into notches 34 at various points on the periphery of the bottom plate 30. In the space between the top plate 23 and the bottom plate 30 is located the heating winding 35 of the sub-unit, which winding may be of any desired type insulated in any suitable manner. The terminals 36 of this heating winding pass through insulating bushings 37 in the bottom plate 30 and are attached to insulated screws 38 carried by a downwardly projecting flange 39 on the under side of the bottom plate 30. These binding screws 38 are connected by suitable wires 40 to the split-terminal pins 12 of the heating unit, this connection putting the windings 35 of the different units in any desired electrical relationship with one another.

When anything happens to the heating unit, requiring it to be inspected, cleaned, or repaired, or to have another one substituted for it, the whole heating unit may be withdrawn from the oven by sliding it forward on the ledges 14, thereby disconnecting the terminal pins 12 from the sockets 15. If merely one sub-unit is defective, this sub-unit may be removed in its entirety from the plate 10 by disconnecting the associated wires 40 from the binding screws 38 of each sub-unit and removing the single bolt 27 which fastens such sub-unit in place. Upon the removal of this bolt 27, this sub-unit may be lifted from the hole 20, and repaired at any convenient point, if repair is possible, or another sub-unit may be substituted for it. If the defect is merely in the winding 35, the two plates 23 and 30 may be separated by removing the screws 31, whereupon the terminals 36 of the defective winding 35 may be released from the binding screws 38, and another winding substituted for such defective winding, the same plates 23 and 30 being used for the new winding.

Having thus described our invention, what we claim as new and desire to secure by Letters Patent, is:

1. A heating unit, comprising a metal slide plate having a plurality of slip connection terminals at one edge for removable engagement with coöperating terminals, said slide plate being provided with a hole, a sub-unit mounted in such hole and having a finger which projects under the edge of the hole and a second finger which is displaced from the first and projects over the edge of such hole, and means for fastening said second finger to said plate, said sub-unit having a heating winding which is connected to said slip connection terminals.

2. A heating unit, comprising a metal plate, said plate being provided with a hole, a sub-unit mounted in such hole and having a finger which projects under the edge of the hole and a second finger which is displaced from the first and projects over the edge of such hole, and means for fastening said second finger to said plate, said sub-unit having a heating winding.

3. An electric heating unit, comprising a plate provided with a hole and with lugs which project inward from the edge of such hole, and a sub-unit which fits in said hole and rests on said lugs, said sub-unit being provided with one finger which projects under the edge of the hole and another finger which is spaced from the first and projects over the edge of such hole, said sub-unit being provided with a heating winding, and means for fastening one of said fingers to said plate.

4. An electric heating unit, comprising a plate provided with a hole and with lugs which project inward from the edge of such hole, and a sub-unit which fits in said hole and rests on said lugs, said sub-unit being provided with one finger which projects under the edge of the hole and another finger which is spaced from the first and projects over the edge of such hole, said sub-unit being provided with a heating winding.

5. A heating unit, comprising a plate having a hole, and a sub-unit which comprises a top plate and a bottom plate with a heating winding between them and releasable means for fastening said two plates together and clamping the heating winding in place, said top plate being removably mounted in said hole flush with the top of said plate.

6. A heating unit, comprising a plate having a hole, a sub-unit which comprises a top plate and a bottom plate with a heating winding between them and releasable means for fastening said two plates together and clamping the heating winding in place, said top plate fitting in said hole and being provided with a finger which projects under the edge of said hole and a finger spaced from the first and projecting over the edge of said hole, and means for fastening one of said fingers to said plate.

7. A heat unit comprising a plate with means for supporting it above an oven bottom, the said plate being provided with an opening, a sub-unit with metallic top and bottom plates disposed within the opening of the main plate, the metal top plate extending beyond said bottom plate and an electric conductor disposed between the top and bottom plates of the sub-unit, as specified.

In witness whereof, we have hereunto set our hands and seals in the presence of two witnesses.

MAURICE E. LOUTH. [L. S.]
JESSE JACKSON. [L. S.]

Witnesses:
JAMES C. PATTEN,
FRED M. RUDDELL.